United States Patent [19]
Hoffman et al.

[11] Patent Number: 6,151,795
[45] Date of Patent: Nov. 28, 2000

[54] FLAT MATERIAL DRYER

[75] Inventors: Karl H. Hoffman, Tequesta; Michael W Pastore; Walter Glowacki, both of Palm Beach Gardens, all of Fla.; David Gunn, Travelers Rest, S.C.

[73] Assignee: MMATS Incorporated, Riviera Beach, Fla.

[21] Appl. No.: 09/153,694

[22] Filed: Sep. 15, 1998

Related U.S. Application Data

[63] Continuation-in-part of application No. 08/876,143, Jun. 13, 1997, Pat. No. 5,806,204.

[51] Int. Cl.[7] ................................................ F26B 13/30
[52] U.S. Cl. .................................................. 34/92; 34/605
[58] Field of Search ........................... 34/92, 605, 73, 34/77, 86, 595, 599, 601, 606

[56] References Cited

U.S. PATENT DOCUMENTS

| | | |
|---|---|---|
| 3,811,199 | 5/1974 | Bouldoires ................................ 34/92 |
| 3,889,389 | 6/1975 | Serup ...................................... 34/15 |
| 4,597,188 | 7/1986 | Trappler .................................... 34/5 |
| 5,743,023 | 4/1998 | Fay et al. ................................ 34/287 |
| 5,806,204 | 9/1998 | Hoffman et al. ......................... 34/92 |
| 5,819,436 | 10/1998 | Helevirta .................................. 34/92 |
| 5,937,536 | 8/1999 | Kieselbach et al. .................... 34/92 |

Primary Examiner—Pamela Wilson
Assistant Examiner—Michelle A. Mattera
Attorney, Agent, or Firm—McHale & Slavin

[57] ABSTRACT

A material drying apparatus having a sealable chamber for receipt of wet material, such as clothing. Material placed into the chamber is dried upon the evacuation of air from the chamber wherein moisture drawn from the material is condensed on a condensate coil placed in the chamber. Heating coils placed around the chamber or beneath a drawer elevate the temperature to enhance condensate operation providing an energy efficient material dryer requiring no make-up air. Drum or thermal blanket enhances temperature elevation. Condensed water is purged after the drying process although provisions provide for an interim purge should excess liquid be drawn from the material.

13 Claims, 6 Drawing Sheets

FLAT MATERIAL DRYER

This is a continuation-in-part of U.S. application Ser. No. 08/876,143 filed Jun. 13, 1997, now U.S. Pat. No. 5,806,204 the disclosure of which is incorporated herein.

FIELD OF THE INVENTION

This invention relates to a material dryer, and in particular to a dryer incorporating a condenser within a vacuum sealed chamber for drawing moisture at moderate temperatures.

BACKGROUND OF THE INVENTION

There is a large variety of materials that require a low moisture content for usage, such as clothing. Clothing can be reused indefinitely if properly washed and dried. For this reason, this application will illustrate its usage as a clothes dryer, however, it will be obvious to one of ordinary skill in the art that the instant invention can be used for drying any type of material. The scope of the invention is defined by the claims appended hereto.

A clothes dryer is a modern material dryer used in conjunction with a washing machine which allows a consumer to quickly launder clothing. The conventional clothes dryer employs a rotating chamber which receives damp clothing directly after the wash cycle. Air is drawn into the rotating chamber at atmospheric pressure past a heating element. The heated air is used for drawing moisture from the clothes and the moisture laden air is continually exhausted from the clothes dryer.

The conventional material dryer expends a large amount of energy as the air drawn into the dryer must be heated. The amount of air drawn into the chamber and amount of energy expended during the process is further dependant upon the condition of the air being drawn into the dryer and amount of clothes to be dried. This process is not efficient due to the amount of thermal energy required to heat the air for a drying cycle which may take upwards of an hour to complete. In addition, if a clothes dryer is placed inside a home, the process may cause additional energy loss as the air is drawn from inside the home and expelled outside.

Should the air being drawn have been previously cooled, such as in an air-conditioned home, the cooled air must be heated for the dryer while new air drawn into the home must be cooled. If the home was heated, the conventional dryer again draws treated air requiring the home to replace the air. In this example the heater of the home must operate to replace the air expelled by the dryer.

Should a clothes dryer be placed outside the home, typical of many southern homes, operation of the clothes dryer is affected by the amount of moisture in the air. A high amount of moisture will require the clothes dryer to operate for a longer period of time in order to complete a drying cycle. In addition, most clothes dryers operate on a timing cycle making it impossible to predict an accurate time to discontinue the heating process due to the various conditions of air make-up. Depending upon the weight of the clothes and moisture content therein as well as the type of air being drawn into the clothes dryer, the drying cycle may take upwards of an hour to complete.

It is generally known that the evaporation temperature of a liquid decreases as the pressure of the surrounding air decreases. Thus, water can be drawn from a material at lower temperatures in a near vacuum environment thereby expending less energy if a lower temperature can be utilized. As a result, a number of prior art devices are directed to the modification of clothes dryers which have been developed to incorporate a vacuum or vacuum like chamber. However, these devices lose efficiency in that they constantly pump air into a chamber for purposes of discharging a volume of air and water vapor out of the device by use of a vacuum pump. Such devices require additional power as the incoming air must be circulated and in most cases heated.

For instance, U.S. Pat. No. 3,425,136 discloses a clothes dryer having an interior drum heater and vertical air ducts wherein the device continuously draws air and water vapor from inside a chamber by use of a vacuum pump. Similarly, U.S. Pat. No. 4,041,614 discloses a device which passes air and water vapor through an exit duct to the exterior of a cabinet. U.S. Pat. No. 4,257,173 discloses a "no heat" clothes dryer which simply incorporates a vacuum source coupled to an exhaust port.

U.S. Pat. No. 4,305,211 discloses a clothes drying chamber whereby air and moisture particles from within the chamber are discharged by creation of a suction on the chamber. U.S. Pat. No. 4,615,125 discloses yet another vacuum chamber with a perforated rotatable drum and vacuum pump which draws air and water vapor from the vacuum chamber and contained drum.

U.S. Pat. No. 5,131,169 discloses a clothes dryer with a drum enclosed in a shell having a compressor to remove air and water vapor from the shell. A cyclic operation of pumping heated air into the shell and removing saturated air is employed. U.S. Pat. No. 5,430,956 discloses a clothes drying device employing a turbo engine for drawing air from a drying room and condensing the liquid thereby reducing the volume of air produced by the drying process. U.S. Pat. No. 5,459,945 discloses a vacuum assisted system for drying clothes which includes an evaporation chamber which is located inside a condensation chamber. In this manner the device extracts water from the evaporation chamber by use of a condensation chamber to condense extracted vapor on the outer surface of the evaporation chamber. While the condenser is used, air is continually circulating out of the vacuum chamber by use of the vacuum pump.

Thus what is lacking in the art is a material drying device that eliminates the constant draw of air into the device, lowers the drying temperature, eliminates a constant evacuation by a vacuum pump, and decreases the amount of time to perform a drying cycle thereby reducing energy and operating costs.

SUMMARY OF THE INVENTION

The present invention teaches an energy efficient material drying method and device. The material dryer of the present invention employs a sealed chamber that allows a near vacuum to be drawn on material, such as clothing, placed within the chamber. Water in the form of vapor is drawn from the material placed within the device by use of a condenser placed within the chamber. The condenser operates to condense the water vapor evaporated from the material. The material is heated to increase the rate of evaporation and to provide the required heat of vaporization. Because the boiling temperature of water decreases as the pressure in the chamber decreases, evaporation can be maximized while maintaining a safe temperature of the material being dried. The material is placed in contact with the heating elements, such as heated surfaces located above and below the material. Movement of the water vapor from the heated material to the condenser Can be enhanced by the use of a fan or similar device if the condenser cannot be located close to the material. The condensed water can be stored within the chamber until the drying cycle is complete or can be purged during the cycle if desired. The operation of the dryer can be controlled by a timer or by sensors which monitor the amount of moisture left in the material, permitting not only full dry operation but also damp dry suitable for operations such as ironing and pressing for material such as clothing.

In one embodiment, a conveyor belt or paddle assembly allows for movement of the material and a circulation fan operates to enhance operation of the condenser. Condensed water is stored within the chamber until a drying cycle is complete, and excess water can be purged during the cycle if necessary. In operation, the interior environment of the material dryer is evacuated of air by use of a vacuum pump to a point which causes the evaporating temperature of water contained within the material to be lower than that at atmospheric pressure and at a safe level for the material. As a result, liquid evaporates into the chamber in the form of water vapor. The water vapor is circulated past the condenser where it re-condenses on the cold surface back into liquid form. The liquid drains off and flows to a holding area where it can be purged before, during, or after the drying cycle.

The inner surface of the chamber is smooth allowing ease of movement of material while allowing for maximum contact with the sides of the chamber. The outer surface of the chamber can be heated by use of coolant coils that operate from the compressor. In this manner excess heat generated by the operating system can be returned to the chamber. A conveyor on the inside of the dryer rotates around a central axis for purposes of moving the material thereby providing uniform drying. Alternatively a paddle may also be used and drive a circulation fan for air circulation.

The heat of vaporization needed for evaporation to occur is supplied by heated surfaces placed in thermal contact with the material. The surfaces are heated from the hot side of an air-conditioner compressor either directly by the freon itself or indirectly by water heated by the freon in a heat exchanger. Similarly, the condenser surfaces are cooled from the cold side of the air-conditioner compressor (after the freon has passed through the expansion valve) either directly by the freon itself or indirectly by water cooled by the freon in a heat exchanger. The efficiency of the air-conditioning cycle used to provide simultaneously the heat needed for vaporization and the cold needed for condensation provides a great energy saving over other methods and is an important part of the present invention. For the most part, the energy supplied for heat of vaporization is not lost but rather recovered in the condenser and recycled, reducing the overall energy consumption.

In another embodiment, the material dryer employs a plurality of flat drying chambers placed in a stacked arrangement. Each drying chamber is hermetically sealed and operates independently, but uses use common vacuum and water systems. Inside of each chamber are heating and cooling surfaces. A removable drawer fits within the chamber and is used to support the clothing or other material to be dried. The drawer rests on a heated surface with an additional heating surface located above the material to be dried. Preferably this upper material is flexible for use in pressing against the material to increase heat transfer and efficiency.

Monitoring of the material dryer is performed by use of conductivity sensors to measure the moisture content of the material being dried. Temperature probes are used to measure various temperatures and pressure sensors are used to measure pressure inside the chamber. The parameters are preset and allow for operation of the heating/cooling compressor. Activation of the compressor will cause heat to be built up and be distributed through the hot coils surrounding the dryer bin or, alternatively, heating elements not associated with the compressor placed around the drying bin may be activated. In any event the increase of heat speeds up the evaporation of liquid from the material to be dried. The newly released water vapor will thereby condense on the condenser coils and be routed to a liquid collection tank. If the liquid collection tank is filled, the tank may be purged either before, during, or after the drying operation. Sensors can also be used to report the moisture content which is indicative of the amount of drying that has occurred allowing the consumer to remove material, such as clothing to be pressed, before complete drying if preferred.

It is noted that liquid in the collection tank is relatively cool due to its inner action with the cold condenser coil. As a result, a set of cooling coils may be routed from the vacuum pump and through the collection tank so as to provide cooling action for the vacuum pump without the system consuming more energy. The cooling action extends the life of the vacuum pump and increases the overall efficiency of the system.

An objective of the present invention is to provide a material dryer based upon the drawing of a partial vacuum on a sealed chamber with a condensate coil placed within the chamber for use in drawing moisture from clothing placed within the chamber.

Another objective of the present invention is to provide a material dryer that is shaped in the form of a drum that may provide a tumble style drying.

Another objective of the present invention is to provide a material dryer that is shaped in the form of one or more drawers that may provide a press style drying.

Another objective of the present invention is to provide a material dryer that eliminates the need for an in-flow of air.

An advantage of the present invention is to provide a material dryer capable of speeding the drying process by approximately fifty percent while using approximately fifty percent less energy over conventional drying devices.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described, in terms of a specific embodiment, it will be readily apparent to those skilled in this art that various modifications, rearrangements and substitutions can be made without departing from the spirit of the invention. The scope of the invention is defined by-the claims appended hereto.

Figure 1:
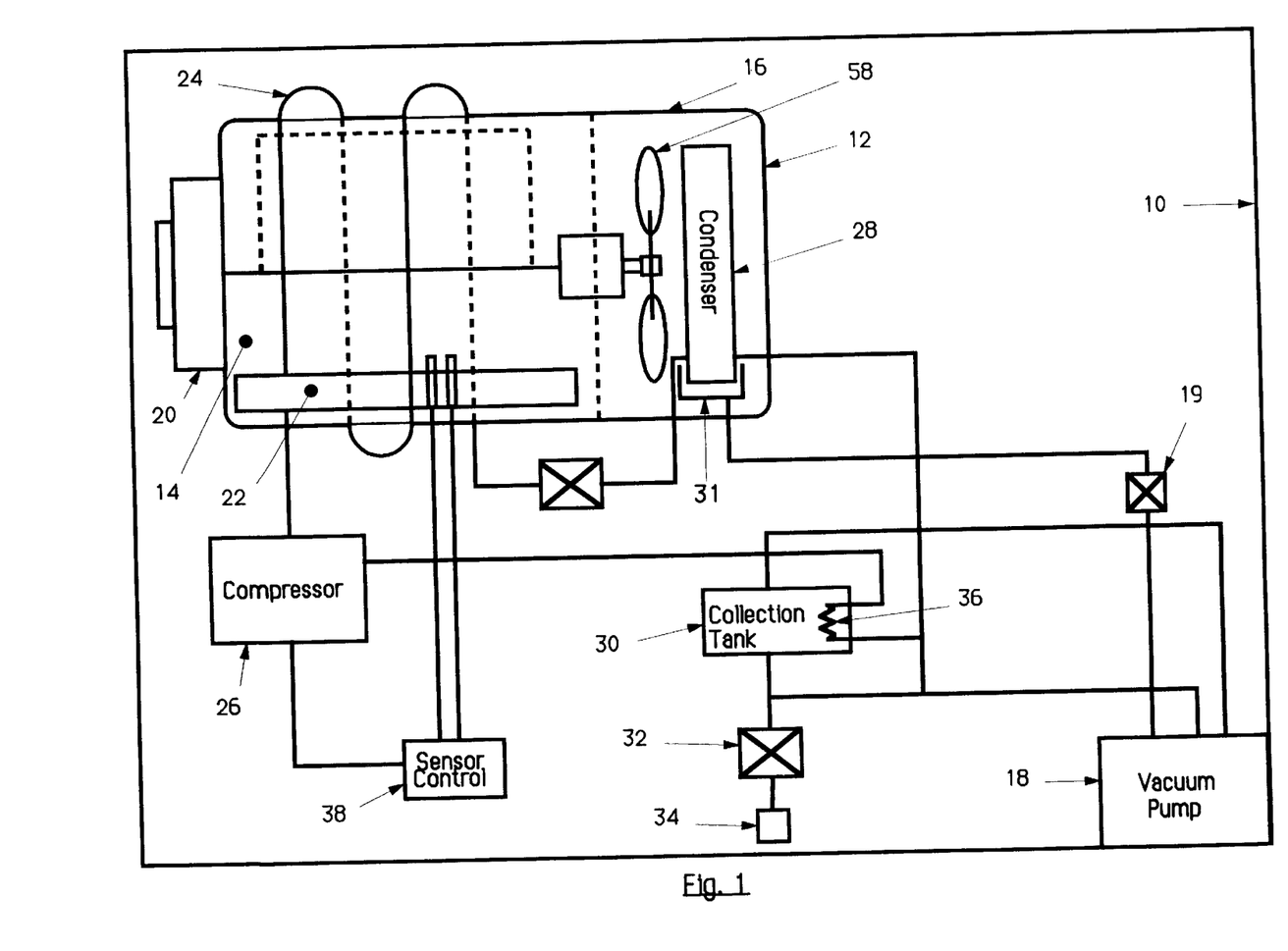
FIG. 1 is a flow schematic of the instant invention.

Referring to FIG. 1, set forth is a simplified flow schematic for the material dryer device of the instant invention. The material dryer includes a housing 10 having a cylindrically shaped chamber 12 mounted horizontally within the housing 10. The chamber 12 is hermetically sealed defining an interior 14 and an exterior 16. The interior 14 is fluidly coupled to a vacuum pump 18 capable of a drawdown vacuum of approximately 28 inches Hg. The vacuum pump 18 operates initially to withdraw air from the chamber through exhaust check valve 19 for maintaining a low pressure environment during the drying cycle with minimum pump operation. In the preferred embodiment, the air is drawn through an internal collection tank 31 through check valve 19 and delivered to a second collection tank 30 for holding and eventual discharge to drain. The second collection tank 30 may allow an overflow to drain, or include a solenoid 32 for purging the collected water to drain 34. The second collection tank 30 providing a ready source of fluid for creation of a water seal for operation of vacuum pump 18.

The interior 14 of the chamber 12 is accessible through a door 20 hingedly coupled to one end of the housing 10 and maintaining a pressure seal to the chamber 12 when closed. A paddle assembly 22, extending substantially along the longitudinal length of the chamber 12, is used to rotate the positioning of clothes placed within the chamber. The paddle assures the clothing contacts the inner surface of the chamber in such a way as to enhance heat transfer through the sidewall of the chamber which is heated along the exterior surface 16 of the chamber.

The chamber may be heated by an electric coil, utilize hot water preheater lines or the hot fluid line 24 as provided by a compressor system. The pressurized fluid is directed through an expansion valve before being directed through a condensate coil 28. The condensate coil 28 condenses moisture from clothing placed within the chamber with the condensed moisture collected in an internal collection tank 31. The condensate is held until the drying cycle is complete, or if full during the cycle, purged by vacuum pump 18 through check valve 19 to collection tank 30. A set of cooling coils 36 may be routed from the condenser 28 and through the collection tank so as to provide cooling action for the vacuum pump 18 without the system consuming more energy. The condensate in the collection tank is relatively cool due to its inner action with the cold condenser coil 28 and will also provide cooling action. The cooling action extends the life of the vacuum pump and increases the overall efficiency of the system.

Sensors 38 are available for determining the relative humidity within the chamber, pressure of drying chamber and temperature for operation of the compressor cycle and temperature control providing operation for only the time needed to complete a drying cycle.

In operation, wet clothing is placed into the chamber 12 through door 20 wherein the vacuum pump 18 draws down the environment within the chamber 12 in about one minute. The compressor 26 then becomes operational in a format similar to a conventional air conditioner with the condensate coils 28 placed within the chamber 12. The compressor pressurizes freon or the like refrigerant material to approximately 265 psi at a temperature of about 220 F. Instead of being used directly, the high pressure liquid from the compressor may be passed through a hot water preheating tank. The preheating tank water may then be used to heat the chamber exterior. The pressurized fluid is drawn through an expansion valve before placement through condensate coils 28. The condensate coils 28 draw the moisture out of the clothes wherein the condensate liquid drains into the collection tank 31. In this manner, 30 pounds of water can be evaporated in approximately 30 minutes, the system utilizing between 30,000 and 60,000 BTU's per hour. Sensors 38 may be used to monitor the time of operation or automatically determine the length of operation by determining moisture content, pressure and temperature of the chamber.

Figure 2:
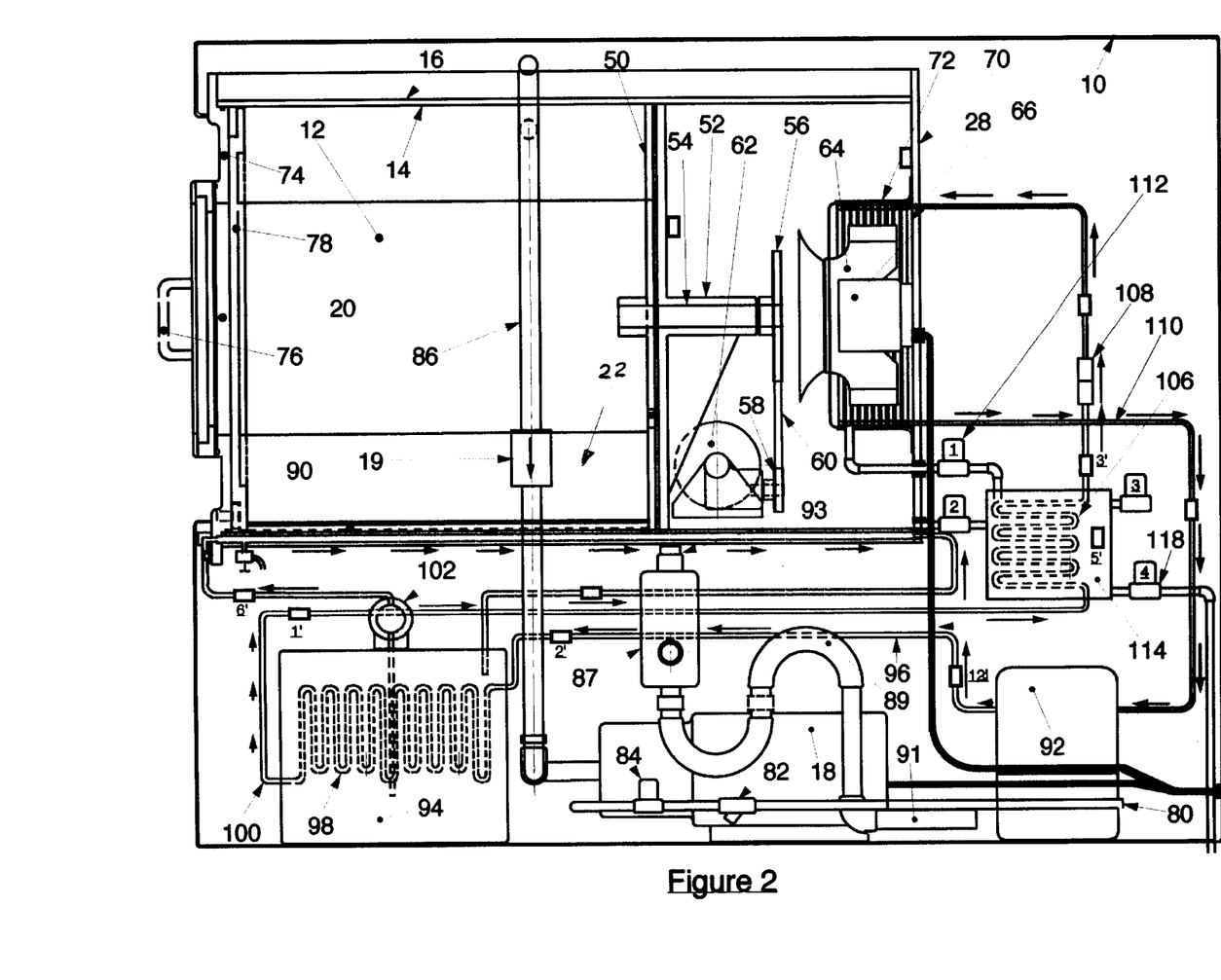
FIG. 2 is a cross sectional side view of the instant invention.
Figure 3:
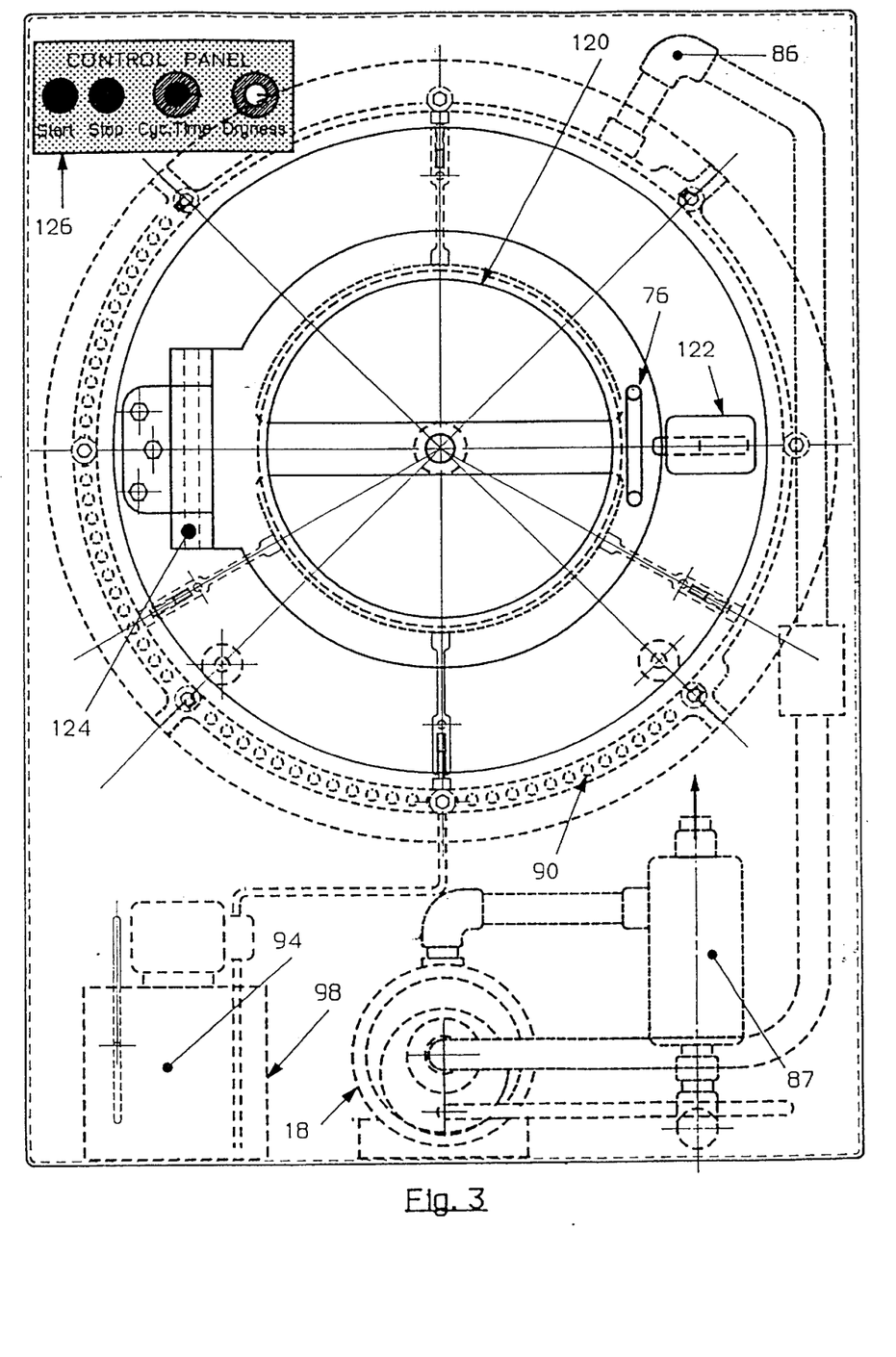
FIG. 3 is a cross sectional end view of FIG. 2.

Referring now to FIGS. 2 and 3, the material dryer device of the instant invention consists of a housing 10 sized to support the operating components of the system including a cylindrically shaped chamber 12 mounted horizontally within the housing 10. The chamber 12 is hermetically sealed defining an interior 14 coated with teflon or the like non-stick coating material and an exterior 16. A rear cage end plate 50 is positioned at the back of the chamber 12 for positioning of clothing placed within the chamber. The chamber includes pusher bars or paddles 22 (shown in FIG. 1) for movement of the clothing around the chamber. The paddles 22 are coupled to a drive shaft support structure 52 held by drive shaft 54. The drive shaft 54 is rotated by a timing belt and pulley assembly having pulleys 58 coupled together by belt 60. The lower of pulley 56 and 58 is rotated by drive motor 62. The paddles 22 assure clothing contact with the inner surface 14 of the chamber 12 allowing the clothing to enhance heat transfer through the sidewall of the chamber.

A centrifugal fan 64 allows for circulation of water vapor through the chamber and past condensate coils 28. The fan 64 is driven by a fan motor 66 supported by back plate 70. Alternatively the fan 64 can be driven by the paddle motor 62 by use of an additional pulley or modification of the pulley into a fan shape. The condensate coils are enclosed in a shroud 72 causing direction flow of the circulation air past the coils 28.

The interior 14 of the chamber 12 is accessible through a door 20 hingedly coupled to one end of the housing 10 along a front door end plate 74 and maintaining a pressure seal to the chamber 12 when closed. The door includes a handle 76 for ease of access. The front of the chamber includes a front cage end plate 78 which is operatively associated with the inner surface of the door 20 for securely positioning the clothes within the chamber.

The interior of the chamber is fluidly coupled to a vacuum pump 18 capable of a drawdown vacuum of approximately 28 inches Hg. The vacuum pump is water sealed with a water inlet 80 drawn through strainer 82 and controlled by inlet solenoid 84. The vacuum pump 18 operates initially to withdraw air from the chamber through exhaust check valve 19 and associated piping 86 for maintaining a low pressure environment during the drying cycle. The vacuum pump exhausts air through the air silencer 87 out of outlet 93. The pump includes a trap 89 to further seal as well as prevent back flow of water discharged to the drain 91.

The chamber may be heated by an electric coil or utilize hot water preheater lines 90 provided by the compressor system 92 wherein the compressor 92 operates at a pressure between 250 and 280 psi. The pressurized fluid is directed through the hot water preheating tank 94 by input pipe 96 through a coiled wrap 98 wherein the input temperature to the compressor at exit pipe 100 is between 220 and 250 F. The heated water is transferred by pump from tank 94 through preheater lines 90 which engage at least a portion of the chamber. The pressurized refrigerant from the compressor 92 is then directed through precooling coils 106 and into expansion valve 108 as it is introduced into the condensate coils 28. Low pressure refrigerant 110 is returned to the compressor motor 92. Condensed moisture is collected along the bottom of the condensate shroud 72 and directed through solenoid valve 112 and into water collector tank 114. The solenoid valve 112 is used to maintain a vacuum in the chamber until the condensate is ready to flow into the water collector tank 114. The water collector tank is purged by a dump valve 118 when the drying cycle is complete, should excess water be present in the collection tank during the drying cycle.

As further illustrated in FIG. 3, the door includes a view area 120 and a solenoid operated latch opener 122 which allows access to the chamber only when the vacuum is removed. The door is mounted along hinge 124 providing a pivotal opening. The chamber heating coil 90 is placed around a portion of the chamber and in particular the area that the wet clothes will contact during rotation. Control panel 126 provides operational control of the system.

Figure 4:
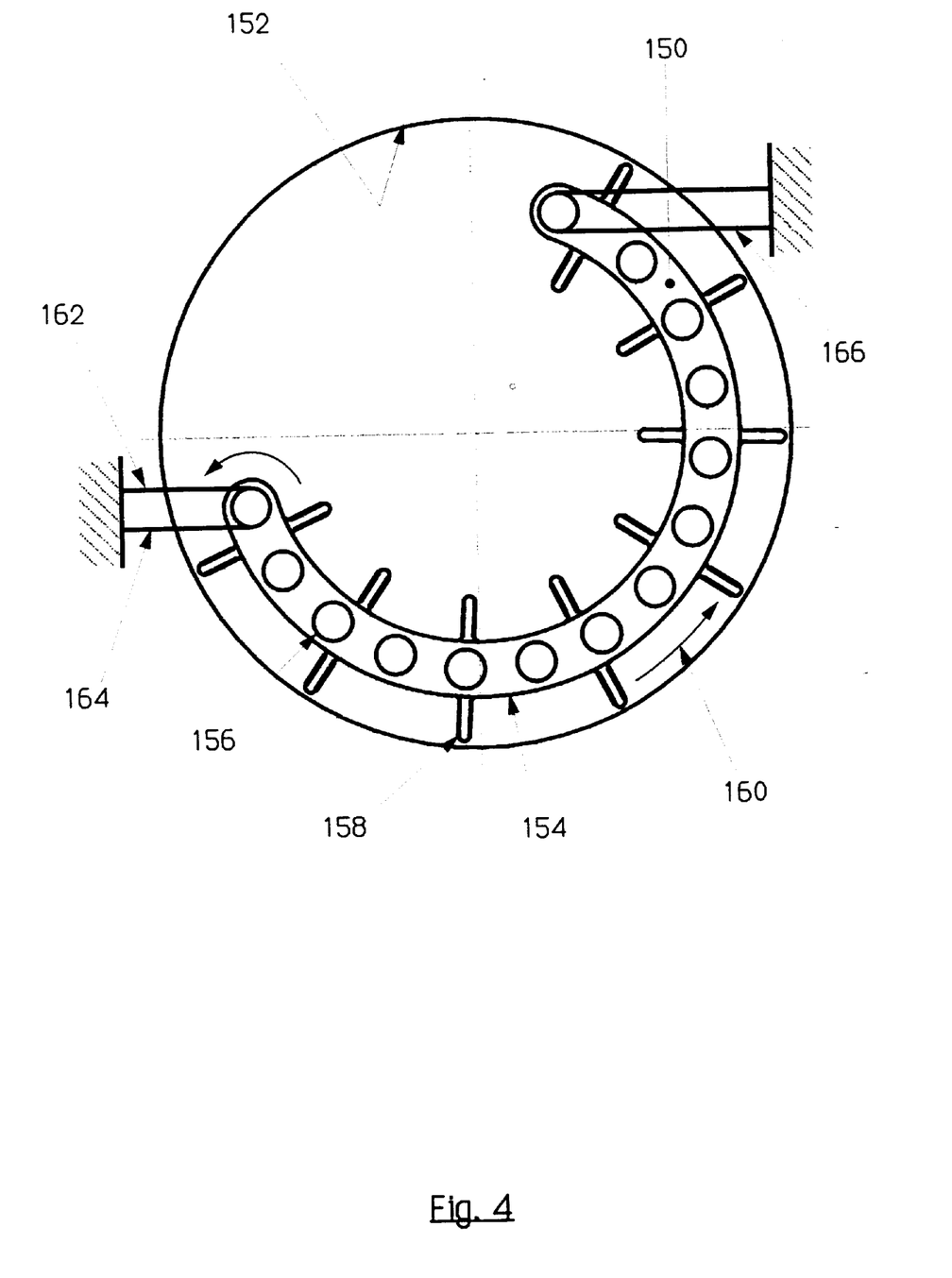
FIG. 4 is a cross sectional pictorial side view of a conveyor belt transport.

FIG. 4 depicts a conveyor belt means 150 depicted along a portion of interior surface 152 of the chamber. In this embodiment, the conveyor belt consists of a continuous flexible belt 154 placed over rollers 156 wherein at least one of the rollers 156 is rotated by an electric motor to cause rotation of the belt. The belt may include paddles 158 to assist is transferring material along a portion of interior surface 152 along directional arrow 160. This embodiment has a particular application for clothing as the belt 154 causes the clothing to maintain a close proximity to the interior surface which, as previously described, allows heat transfer into the clothing to provide heat of vaporization. The entry area 162 may be enlarged to accommodate the type of material circulated wherein paddle 158 provides an enlarged grasp of the material for placement into the entry area 162. The conveyor assembly 150 can be supported by brackets 164 and 166. Bracket 164 may be made adjustable to accommodate various size loads.

Figure 5:
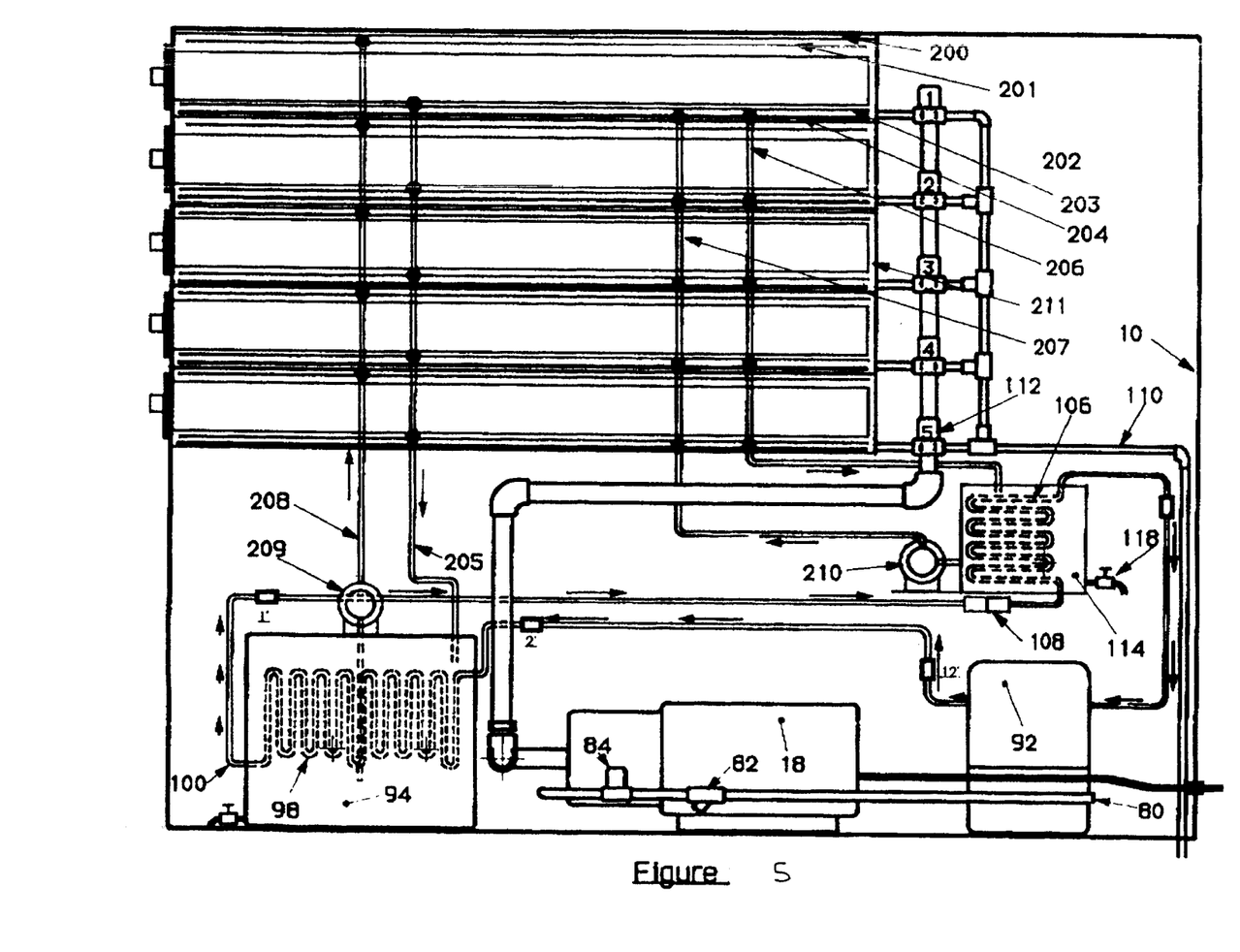
FIG. 5 is a cross sectional pictorial side view of a second embodiment directed to a plurality of drawers.
Figure 6:
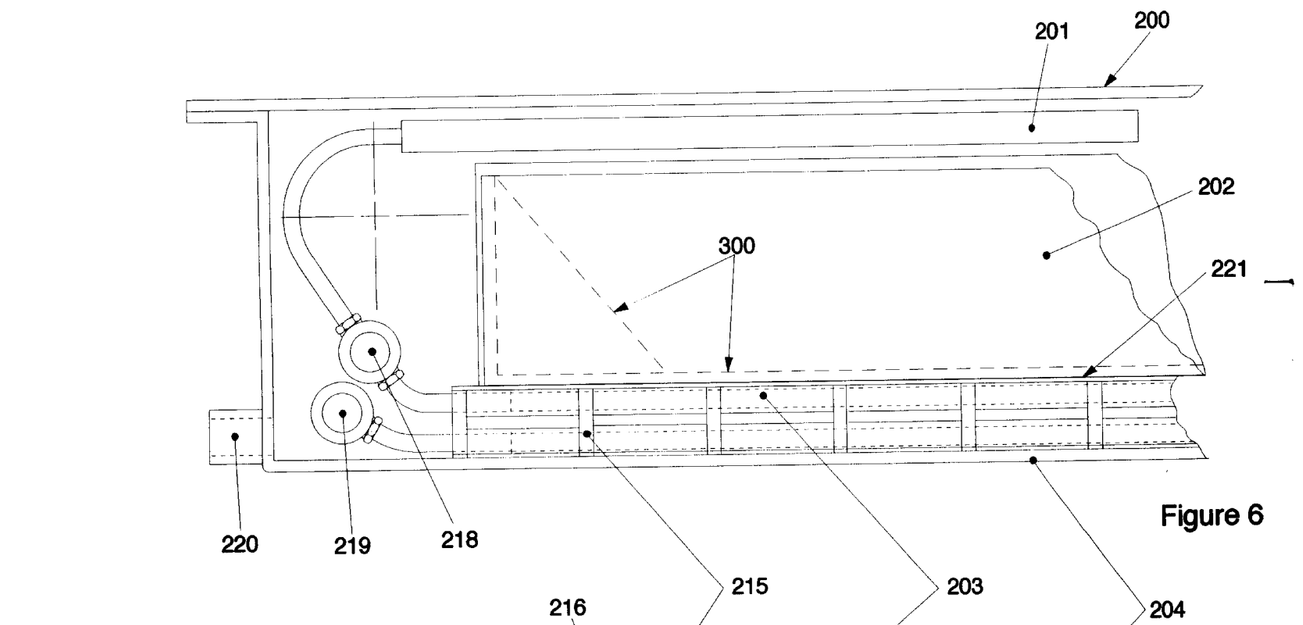
FIG. 6 is a cross sectional side view of a drawer assembly.
Figure 7:
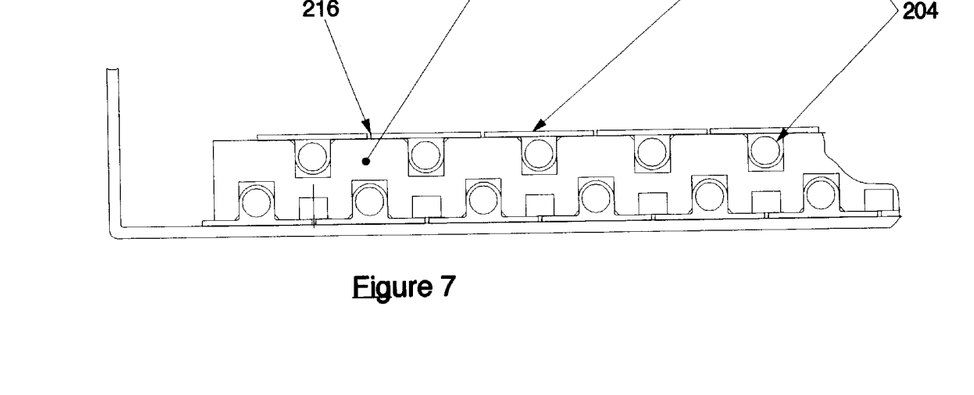
FIG. 7 is a partial end view of FIG. 6.

Now referring to FIGS. 5–7, set forth is a second embodiment of the invention which employs a plurality of flat drying chambers 211 placed in a stacked arrangement. Each drying chamber 211 is hermetically sealed and operates independently, but uses common vacuum and water systems. Inside of each chamber are heating and cooling surfaces. A removable drawer fits within the chamber and is used to support the clothing or other material to be dried. The drawer rests on a heated surface with an additional heating surface located above the material to be dried. Preferably this upper material is flexible for use in pressing against the material to increase heat transfer and efficiency.

In this embodiment, housing 10 includes multiple drying units of chamber 211, the illustration depicting five drying units stacked in above each other. The chambers operate independently but use common vacuum and water systems. Each chamber 211 is hermetically sealed and connects to the common vacuum system 18. At the start of a cycle, the chamber is drawn down to a vacuum of approximately 28 inches of Hg by the vacuum pump. The vacuum system can then be shut off until needed. If the vacuum pump can handle water, e.g. a liquid-ring pump, the pump can also be used to drain the condensate water.

Inside each chamber 211 are heating surfaces 201 and 203 and condensing surfaces 204. A removable basket 202, drawer, or combination thereof containing the material to be dried is placed over the heating surfaces. In particular, the drawer 202 is inserted though a door, not shown, and placed on the heated surface which consists of a number of aluminum strips 203 through which the hot water is circulated from a hot water tank 94 by use of pump 209. The aluminum strips 203 are mounted on plastic supports 215 which maintain the strips in a fixed position with a small gap 216 between adjacent strips. The gap 216 allows evaporating water vapor to pass from the material being dried through the bottom of the drawer down to the condenser plate 204 mounted at the bottom of the chamber. The condenser plate 204 is made of aluminum strips with integral tubes through which cold water is circulated from a cold water tank 114 by means of water pump 210 through manifold 219.

Additional heating of the material is accomplished by a second heated surface located above the material. It is desirable that this upper surface is made flexible so that it can be pressed down onto the material in the drawer, thereby increasing the heat transfer and efficiency of the surface. In the present embodiment, this upper surface is a tubular blanket 201 constructed of connected neoprene tubes through which hot water is circulated along manifold 218. To ensure efficient thermal contact is made between this tubular blanket 201 and the material to be dried, the upper surface of the drying unit includes a neoprene membrane 200. The membrane 200 is pressed down on the tubular blanket 201 and the material in the drawer 202 as shown by the dotted line 300 in FIG. 6 by action of the atmospheric pressure outside the chamber. This pressure does not harm the unit because it is transmitted through the material, the heated aluminum strips 203, the plastic supports 215, and the cold condenser aluminum strips 204 to the bottom of the unit which is experiencing a balancing upward force from the atmospheric air beneath it. Condensate outlet of the unit is through coupling 220. The drying unit becomes effectively a sandwich in which the material is pressed, maximizing the thermal contact with the heated surfaced above and below.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A material dryer device comprising: a housing; a hermetically sealed chamber mounted within said housing, said chamber further defined by an interior and an exterior; a pump in fluid communication with said interior for drawing a vacuum in said chamber; a door hingedly coupled to one end of said chamber, said door allowing a resealable access to said interior for placing wet material inside said interior; means for elevating the temperature of said chamber defined as a plurality of aluminum strips through which hot water is circulated; a condensate coil for condensing moisture contained in the material placed in said interior; and a container for storing condensed moisture; including a means for circulating water vapor past said condensate coils: including at least one drawer slidably inserted into said interior for holding the material and including a tubular blanket positionable above said drawer.

2. The material dryer according to claim 1 including a neoprene membrane positionable above said tubular blanket.

3. The material dryer device according to claim 1 including a means for pressurizing and heating fluid directed through said means to elevate chamber temperature, said pressurized and heated fluid drawn through an expansion valve juxtapositioned to said condensate coil.

4. The material dryer device according to claim 3 including a hot water preheating tank.

5. The material dryer device according to claim 4 wherein said hot water preheating tank is maintained at a temperature of about 175 F.

6. The material dryer device according to claim 1 wherein said pump has a drawdown vacuum of approximately 28 inches Hg.

7. The material dryer device according to claim 1 including a means controlling the operation of said material dryer according to the moisture contents of the clothing placed within the chamber.

8. A material dryer device comprising: a housing; a hermetically sealed chamber mounted within said housing, said chamber having an interior and an exterior surface; at least one drawer slidably insertable into said chamber for receiving wet material; said drawer including a tubular blanket positionable above said interior of each said drawer; a pump in fluid communication with said interior for drawing a vacuum in said chamber; a plurality of spaced apart aluminum strips through which hot water is circulated for elevating the temperature of said chamber; a condensate coil for condensing moisture contained in said wet material placed in said drawers; means for pressurizing and heating fluid directed through said means to elevate chamber temperature, said pressurized and heated fluid drawn through an expansion valve juxtapositioned to said condensate coil; means for circulating water vapor past said condensate coil; and a container for storing condensed water vapor.

9. The material dryer device according to claim 8 including a thermal blanket positionable above said drawer.

10. The material dryer device according to claim 9 wherein said thermal blanket is a neoprene membrane.

11. The material dryer device according to claim 8 wherein said pump has a drawdown vacuum of approximately 28 inches Hg.

12. The material dryer device according to claim 8 including a means controlling the operation of said material dryer according to the moisture content of the clothing placed within the chamber.

13. The material dryer device according to claim 8 including a means for spacing hot and cold fluid tubes.

* * * * *